US005461663A

United States Patent [19]

Motegi

[11] Patent Number: 5,461,663

[45] Date of Patent: Oct. 24, 1995

[54] SELECTIVE CALL RECEIVING APPARATUS HAVING SWITCH FOR CLOCK TIME SETTING

[75] Inventor: Takamasa Motegi, Kawasaki, Japan

[73] Assignee: Matsushita Electric Industrial Co., Ltd., Osaka, Japan

[21] Appl. No.: 93,031

[22] Filed: Jul. 19, 1993

Related U.S. Application Data

[63] Continuation of Ser. No. 789,090, Nov. 7, 1991, abandoned.

[30] Foreign Application Priority Data

Nov. 16, 1990 [JP] Japan .................................... 2-311715

[51] Int. Cl.[6] ............................ H04M 11/00; G08B 5/22; G04C 11/02; H04L 7/00

[52] U.S. Cl. .......................... 379/57; 340/825.44; 368/47; 375/354; 455/38.1; 455/70; 455/231

[58] Field of Search ................................ 379/56, 57, 67, 379/88, 102, 104, 105, 188, 199; 340/825.44; 368/47; 375/106; 455/70, 38.1, 231

[56] References Cited

U.S. PATENT DOCUMENTS

| | | | |
|---|---|---|---|
| 4,650,344 | 3/1987 | Allgaier et al. | 368/47 |
| 4,907,255 | 3/1990 | Kurokawa | 379/102 X |
| 4,924,496 | 5/1990 | Figa et al. | 379/199 X |
| 4,942,598 | 7/1990 | Davis | 379/199 X |
| 5,020,097 | 5/1991 | Tanaka et al. | 379/102 |
| 5,077,706 | 12/1991 | Ganter | 368/47 |
| 5,089,814 | 2/1992 | Deluca et al. | 340/825.44 X |
| 5,150,954 | 9/1992 | Hoff | 340/825.44 |
| 5,239,679 | 8/1993 | Murai | 340/825.44 X |

FOREIGN PATENT DOCUMENTS

| | | | |
|---|---|---|---|
| 0210038 | 10/1985 | Japan | 340/825.44 |
| 0092045 | 5/1986 | Japan | 340/825.44 |

*Primary Examiner*—James L. Dwyer
*Assistant Examiner*—Harry S. Hong
*Attorney, Agent, or Firm*—Spencer, Frank & Schneider

[57] ABSTRACT

A selective call receiving apparatus with a display for receiving and displaying its own selective call number and message information attached to it, displaying time while waiting for a call to be received and displaying the message information added with a receiving time. The selective call receiving apparatus with a display comprises a comparing unit for comparing the message information with preset individual message information and for producing a coincidence signal when both items of information have coincided, a clock time setting unit which operates based on the coincidence signal from the comparing unit, and a display unit for displaying an output from the clock time setting unit.

6 Claims, 8 Drawing Sheets

SELECTIVE CALL RECEIVING APPARATUS HAVING SWITCH FOR CLOCK TIME SETTING

This application is a continuation of application Ser. No. 07/789,090, filed Nov. 7, 1991, now abandoned.

BACKGROUND OF THE INVENTION

The present invention relates to a selective call receiving apparatus having a display which can be used for mobile communication or the like.

In recent years, there have been proposed selective call receiving apparatus with a display having a clock function. The selective call receiving apparatus with a display has an independent clock function, and the apparatus makes a display of the time when the apparatus is in the state of waiting for a call to be received, and when a call is being received, the apparatus makes a display of message information that has been received together with time information showing the time of receiving the call.

The selective call receiving apparatus with a display has exclusive switches for setting or altering the clock time and uses the display unit of the receiving apparatus to display both message information and clock information. It can also make a display of a clock time setting mode.

For example, there are three kinds of clock time setting switches as follows:

a) a push switch for starting and ending setting of the clock time, b) a push switch for setting an hour level, and c) a push switch for setting a minute level.

As switches for the conventional call receiving apparatus, there are the following three kinds of switches:

d) a power source switch, e) a switch for stopping the sounding of a clock alarm and for reading a message memory, and f) a slide switch for changing over between sounding and nonsounding of the clock alarm.

In order to set a time, the power source switch is turned on first, and the push switch for starting and ending the setting of a time is depressed to start this switch, thereby obtaining a clock time setting mode. In the clock time setting mode, the time of an initial value "00:00" is displayed in the display unit and the display of the hour level and the minute level flickers. Then, each time when the push switch for setting an hour level is depressed, a numerical value of the hour level is incremented by "1" to update the hour level so that the hour level can be sequentially displayed from "00" to "23" levels. After updating the hour level to a desired value, the push switch for setting a minute level is similarly operated to update the numerical value of the minute level to a desired value between "00" and "59". After setting the clock time level to a desired time level as described above, the push switch for starting and ending the setting of a clock time is depressed again to complete (end) the setting of the clock time.

It is not necessary to provide the above-described exclusive push switch for setting an hour level and the exclusive push switch for setting a minute level, if the following arrangement is made. That is, the slide switch for changing over between sounding and nonsounding of the clock alarm is set at the sounding position, and at this set position, the switch for stopping the sounding and for reading the message memory is depressed, to make it possible to carry out an operation which is similar to the operation of having depressed the push switch for setting an hour level. Then, the slide switch for changing over between sounding and nonsounding of the clock alarm is set at the nonsounding position, and at this set position, the switch for stopping the sounding and for reading the message memory is depressed, to make it possible to carry out an operation which is similar to the operation of having depressed the push switch for setting a minute level. By having the above arrangement, it is possible to omit the exclusive switches.

As another method of using only the switches of the conventional receiving apparatus, it is also possible to set a clock time setting mode in the following manner. That is, when the clock alarm is not sounding and also when the last of the message memory is being read, the switch for stopping the sounding and for reading the message memory is kept depressed for a predetermined period of time at the sounding position of the slide switch for changing over between sounding and non-sounding. Then the period of time while the switch for stopping the sounding and for reading the message memory has been kept depressed is measured and the clock time setting mode is obtained after the continuation of the depression of the switch for a predetermined time (for example, two seconds). In this mode, it is possible to carry out the operation such that a numerical value of the hour level is updated by depressing the switch for stopping the sounding and for reading the message memory at the sounding position of the slide switch for changing over between sounding and nonsounding, a numerical value of the minute level is updated by depressing the switch for stopping the sounding and for reading the message memory at the nonsounding position of the slide switch for changing over between sounding and nonsounding, and the clock setting mode is terminated by returning the slide switch for changing over between sounding and nonsounding to the sounding position.

As described above, it is possible to set a clock time by providing exclusive switches for setting a clock time or to set a clock time by using the switches of the conventional receiving apparatus in a special operational procedure.

According to the above-described conventional selective call receiving apparatus with a display, the provision of exclusive switches for the setting of a clock time leads to an increase in the number of parts required and an increase in cost, which is against the desired direction of compactness and low cost of the receiving apparatus. Further, according to the method of setting a clock time by operating the switches of the conventional receiving apparatus in a special operating procedure, the switch operation becomes complex, leading to an inconvenient operation.

Usually, a setting of a clock time is carried out at the rate of about once in a few days. Since this is not a function which is used frequently, consideration should be given to the designing of the apparatus so that the clock time setting function is not easily used when there occurs a malfunction.

In order to eliminate the above-described conventional problems, it is an object of the present invention to provide a selective call receiving apparatus with a display requiring a reduced number of parts and which can set the clock time in a simple operation.

SUMMARY OF THE INVENTION

In order to achieve the above object, the present invention provides a selective call receiving apparatus with a display which can receive and display its own selective call number and message information attached to this number and which can display the time while waiting for a call to be received and can display a call receiving time together with the message information. The apparatus comprises a first unit for comparing the above message information with preset individual message information and for outputting a coincidence signal when they coincide, a clock time setting unit which operates based on the coincidence signal from the first unit, and a display unit for displaying an output signal from the clock time setting unit.

Therefore, according to the present invention, it does not involve an expansion of exclusive switches or a complexity of switch operations. Further, the switching function does not work when a malfunction occurs.

Further, it is possible to register the message information in a storage section for storing a selective call number by using desired message information, so that there is an effect that it is possible to realize the function by using message information which can be easily used by users. For example, message information "117" is a public telephone number for obtaining a time report, which is well-known in Japan. It is rare that "117" is used as a single number for message information among users, and thus this is one kind of effective message information.

DESCRIPTION OF THE PREFERRED EMBODIMENT

The present invention will be explained in detail with reference to the drawings. In the following explanation, "message information" refers to letters and symbols visually expressed which are represented by the BCD code or the ASCII code, and "a message information number and a selective call number" refers to binary coded digital signals.

Figure 1:
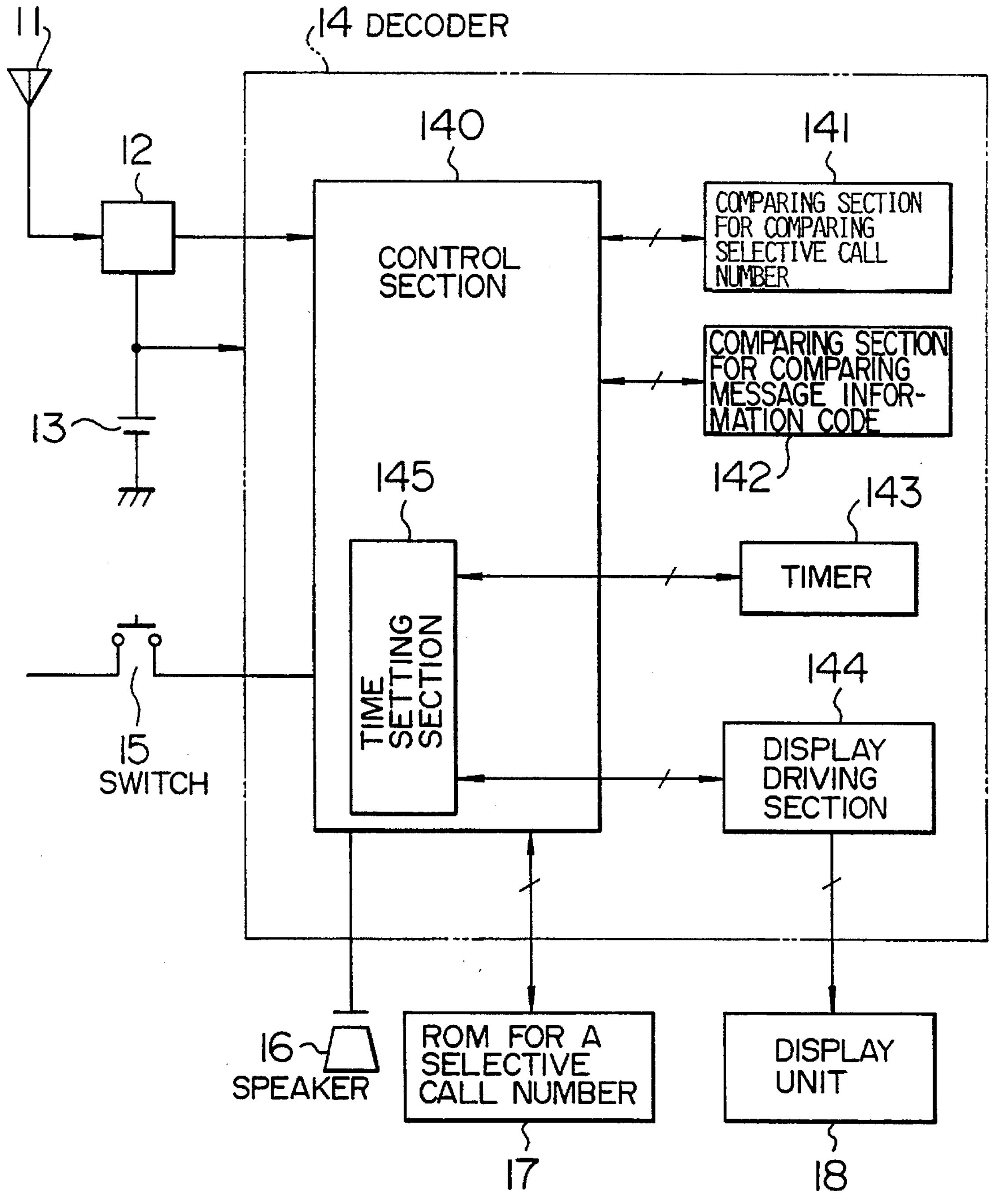
FIG. 1 is a block diagram showing one embodiment of the present invention.

FIG. 1 is a block diagram showing one embodiment of a selective call receiving apparatus with a display according to the present invention.

In FIG. 1, an antenna 11 is connected to a radio section 12 to supply a received modulation signal guided to the antenna 11 to the radio section 12. The radio section 12 demodulates a modulated signal that has been inputted and produces an output signal as a digital signal. A symbol 13 designates a power source which supplies driving power to the whole of the apparatus. An output terminal of the radio section 12 is connected to a decoder 14 to supply a digital signal from the radio section 12 to the decoder 14. A switch 15, a speaker 16 and a ROM for a selective call number 17 are connected to the decoder 14. The decoder 14 carries out a selective call operation based on a received signal (a signal shown in FIG. 3 (A) which will be explained in detail later), drives the speaker 16 to produce a sound and drives the display unit 18 to make a display. The decoder 14 comprises a control section 140, a comparing section 141 for comparing a selective call number, a comparing section 142 for comparing a message information code, a timer 143 and a display drive section 144. A clock time setting section 145 is provided in the control section 140. An output of the radio section 12 is applied to the control section 140 to compare the signal as a received signal. The control section 140 reads a selective call number from the ROM for a selective call number 17, inputs the read number as a reference information code to the selective call number comparing section 141, and inputs the output signal of the radio section 12 as an information code to be compared to the selective call number comparing section 141, to compare these inputs in the selective call number comparing section 141. When a coincidence signal is supplied from the selective call number comparing section 141 to the control section 140 as a result of the comparison, the control section 140 reads a message information code (an information code shown in FIG. 3(B) which will be explained later in detail) that follows the selective call number. Then, the control section 140 supplies the message information code, as message information attached to the selective call number, to the display drive section 144, so that the display information is displayed in the display unit 18. At the same time, the control section 140 drives the speaker 16 to sound an alarm. The display unit 18 and the display drive section 144 constitute a display apparatus.

Figure 2:
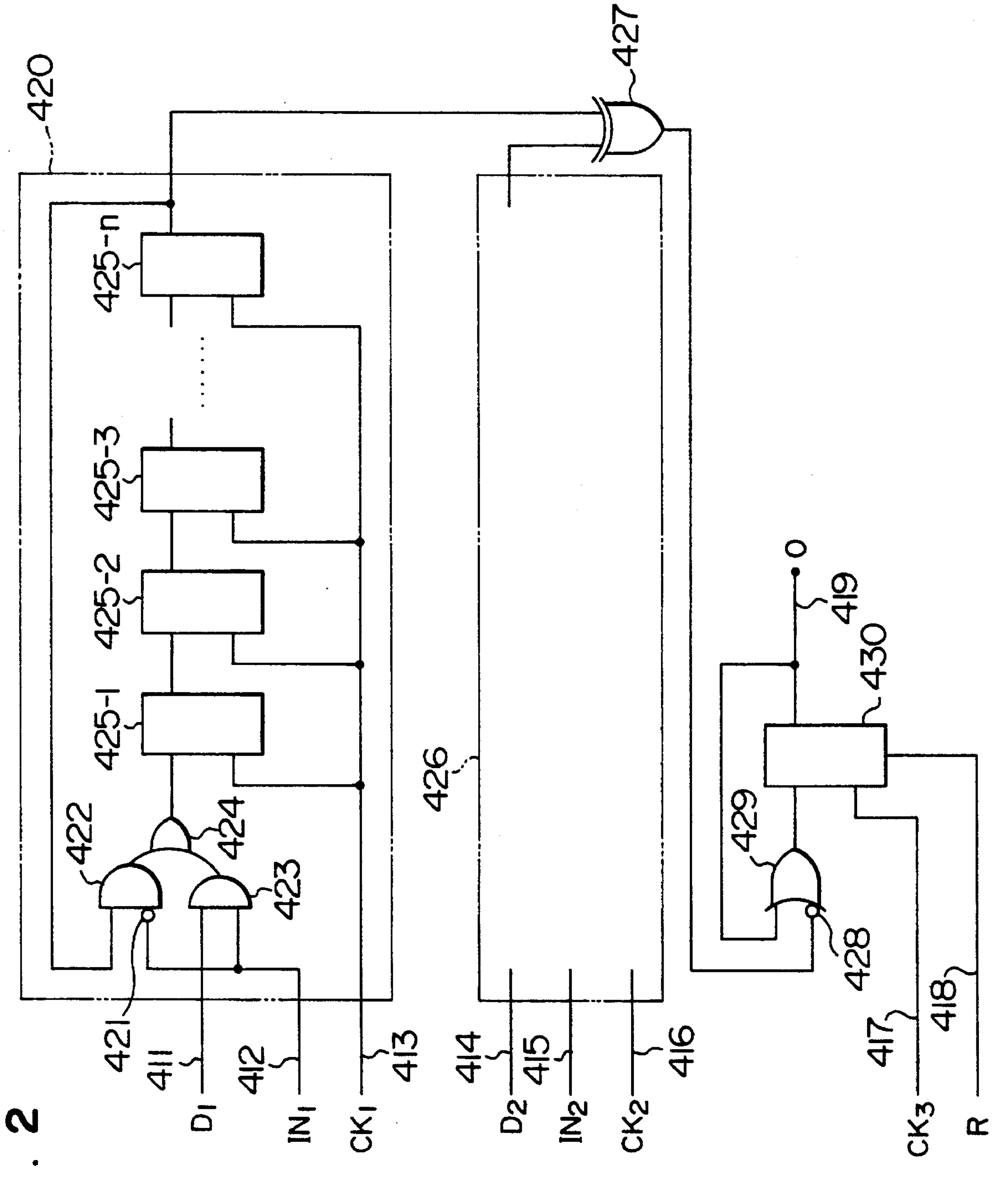
FIG. 2 is a circuit diagram showing a circuit configuration of a comparator section of the same embodiment.

FIG. 2 is a circuit diagram showing an example of circuit configurations of the comparing section for comparing the selective call number and the comparing section for comparing the message information code that are used in the embodiment of the present invention.

In FIG. 2, the same circuit configuration can be used for the comparing section 141 for comparing the selective call number and the comparing section 142 for comparing the message information code. Therefore, the configuration of only one of these comparing sections will be explained below.

As a reference information code, data (a $D_1$ signal) is inputted to a terminal 411, a change-over signal (an $IN_1$ signal) is inputted to a terminal 412 and a driving clock signal (a $CK_1$ signal) is inputted to a terminal 413. Similarly, as an information code to be compared, a data (a $D_2$ signal) is inputted to a terminal 414, a change-over signal (an $IN_2$ signal) is inputted to a terminal 415 and a driving clock signal (a $CK_2$ signal) is inputted to a terminal 416. A driving clock signal (a $CK_3$ signal) for driving a D type flip-flop 430 that plays the role of an incoincidence bit counter is inputted to a terminal 417. A reset signal (an R signal) for resetting the D type flip-flop 430 is inputted to a terminal 418.

A circular mobile circuit 420 stores data of the reference information code which is inputted as described above and circulates the data. The circular mobile circuit 420 comprises an AND gate 422 having an inversed input terminal 421; an AND gate 423, an OR gate 424 and D type flip-flops $425_{-1}$ to $425_{-n}$.

A circular mobile circuit 426 has a configuration similar to that of the circular mobile circuit 420, to store data of an information code to be compared which is inputted as described above and circulate the data.

Output signals from the circular mobile circuit 420 and the circular mobile circuit 426 are inputted to an exclusive logical sum circuit 427. An output from the exclusive logical sum circuit 427 is inputted to an exclusive logical sum circuit 429 having an inversed input terminal 428. An output from the exclusive logical sum circuit 429 is inputted to a flip-flop 430. An output from the flip-flop 430 is produced as an output of an output terminal 419.

FIGS. 3(A) and (B) are explanatory diagrams showing the structure of a transmission signal in the same embodiment.

Figure 3:
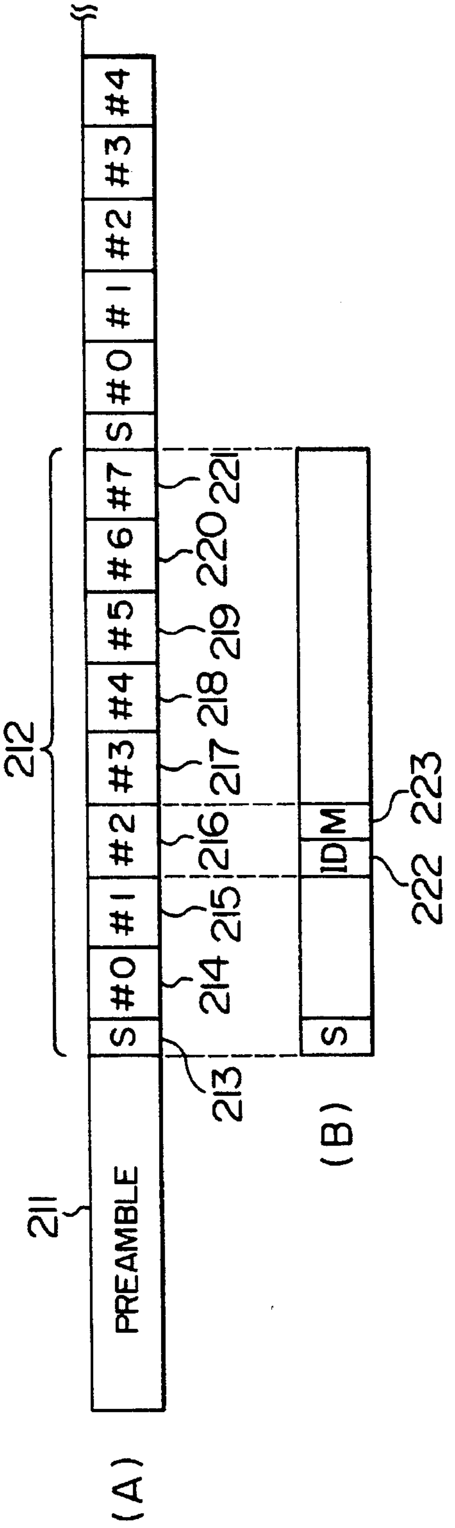
FIG. 3 is a diagram for explaining an example of the configuration of a transmission signal relating to the above embodiment.

FIG. 3 (A) is a diagram showing the structure of a transmission signal of a CCIR No. 1 system which is the signal system used in the present embodiment.

A transmission signal shown in FIG. 3 (A) comprises a preamble signal 211 and a batch signal 212. The batch signal 212 comprises a frame synchronizing signal 213 having a length of one code word and eight frame code signals (214 to 221) each having a length of two code words. The frame code signal 214 has a frame number "0", the frame code signal 215 has a frame number "1", and similarly the following frame signal have successive numbers, with the last frame code signal 221 having the frame number "7".

FIG. 3 (B) is a diagram for explaining the case where a selective call number has been inserted into the frame number "2" (216). The frame code signal 216 comprises a selective call number 222 and a message information code 223 attached to this selective call number 222.

FIGS. 4(A) and (B) are diagrams showing an example of configurations of the message information code shown in FIG. 3.

Figure 4:
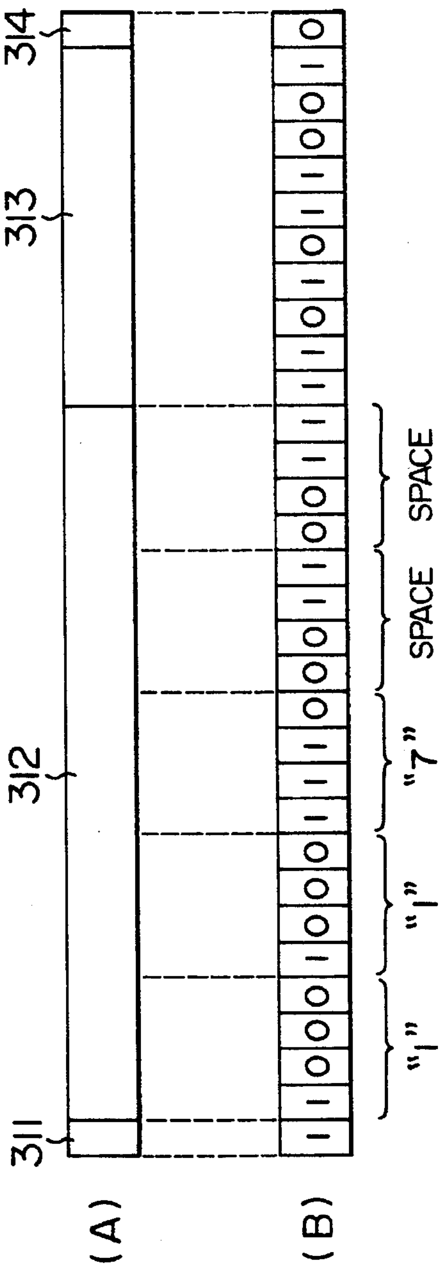
FIG. 4 is an explanatory diagram showing an example of the configuration of a message information code in FIG. 3.

Referring to FIG. 4 (A), the one code word has 32 bits, and a first bit 311 of the MSB is a message identification bit which is a binary code. When the message identification bit 311 is "1", it is a message information code and when the message identification bit is "0", it is a selective call number. Either a selective call number or a message information code is inserted into an information bit 312. A check bit 313 is calculated by the message identification bit 311 and the information bit 312. An even parity bit 314 is calculated by the message identification bit 311, the information bit 312 and the check bit 313. In the following explanation, a selective call number or a message information code means a code string of one code word unit expressed in 32 bits in the bit numbers 311 to 314.

FIG. 4(B) shows an example of a binary code according to the BCD code for showing message information "117" expressed in code words shown in FIG. 4(A).

The operation of an embodiment having the above-described configuration will be explained below.

Figure 5:
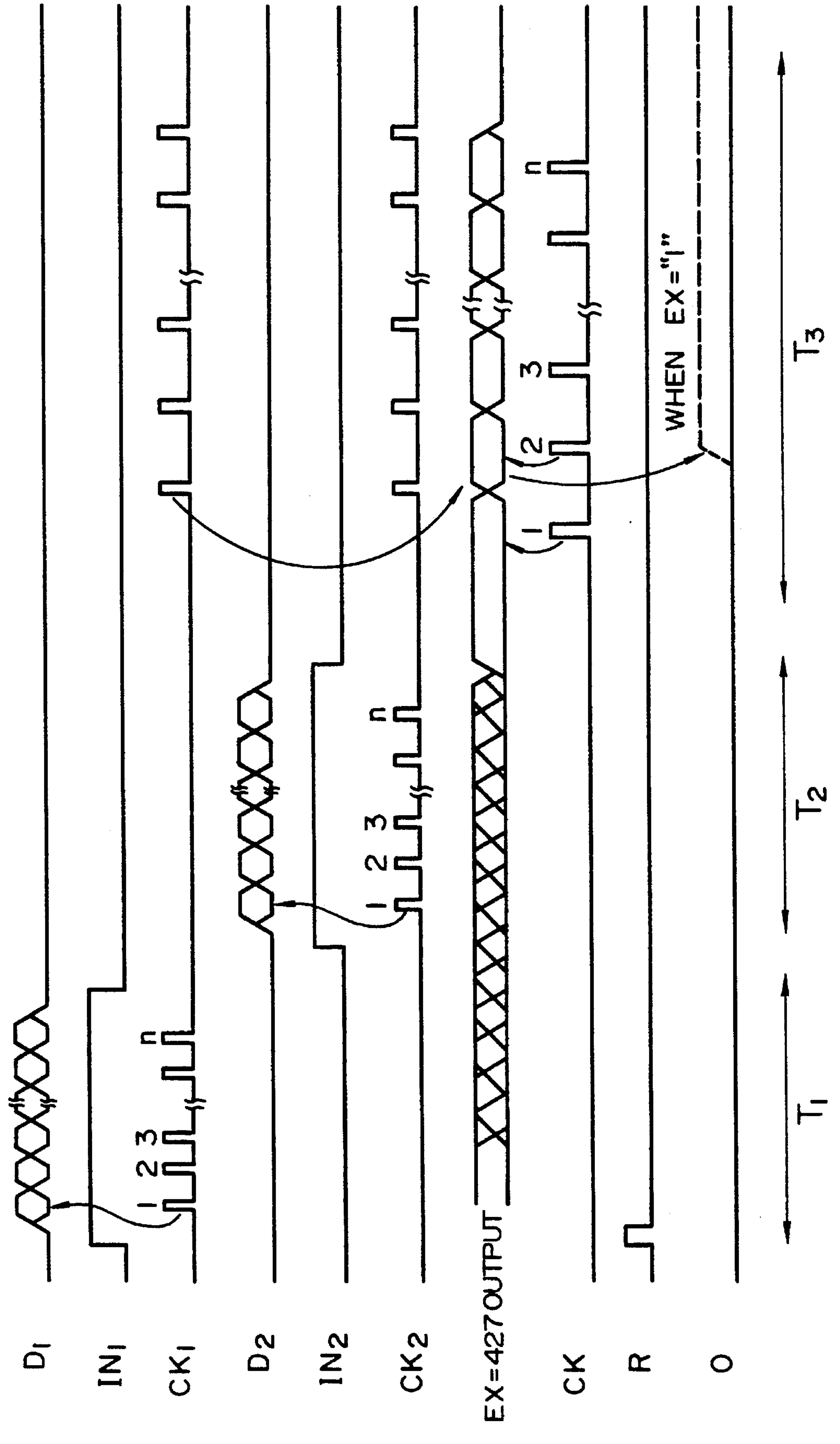
FIG. 5 is a timing chart for explaining the operation of the circuit shown in FIG. 2.
Figure 6A:
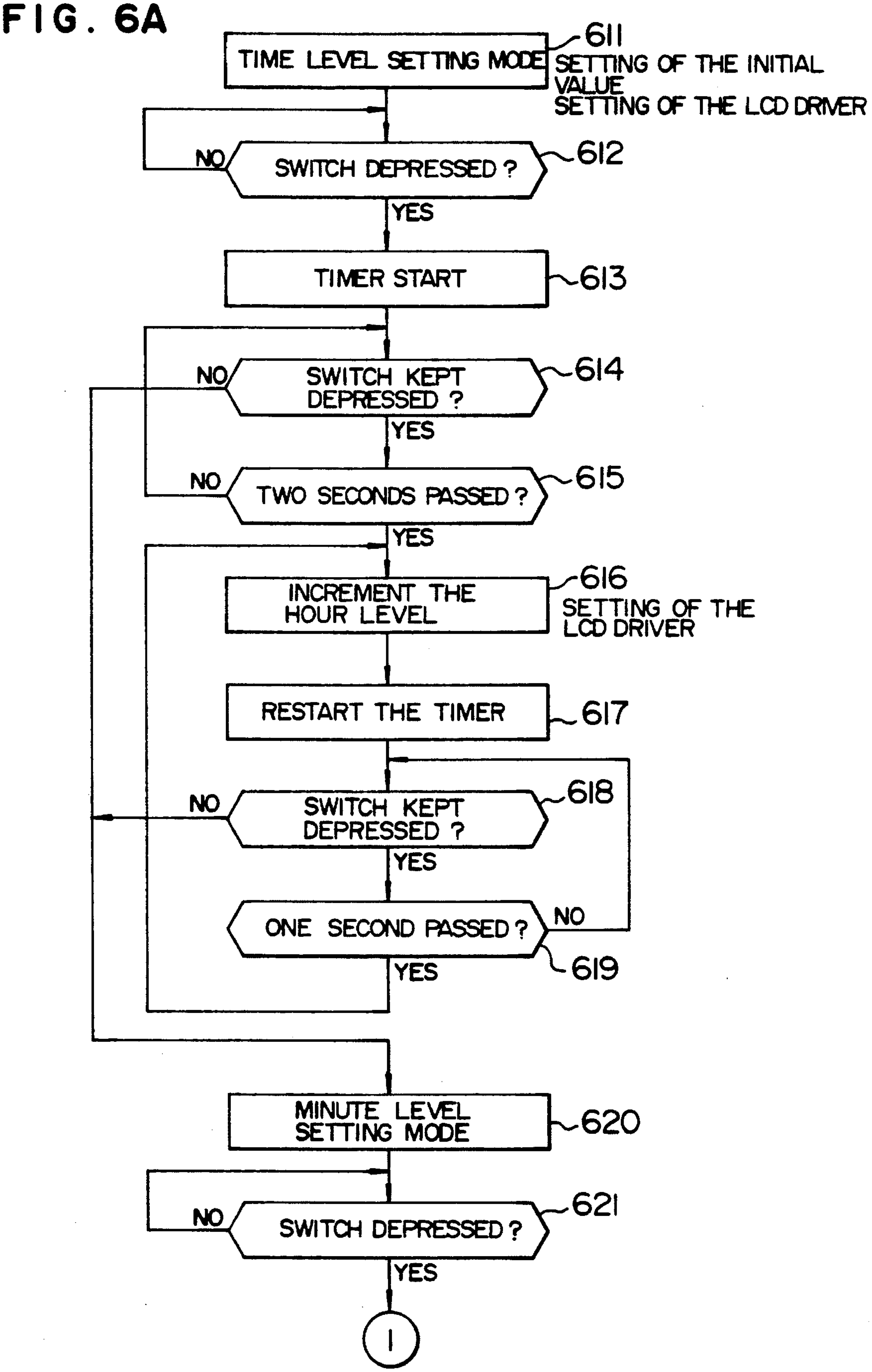
FIGS. 6A and 6B are flow charts for explaining the operation of a clock time setting section shown in FIG. 1.
Figure 6B:
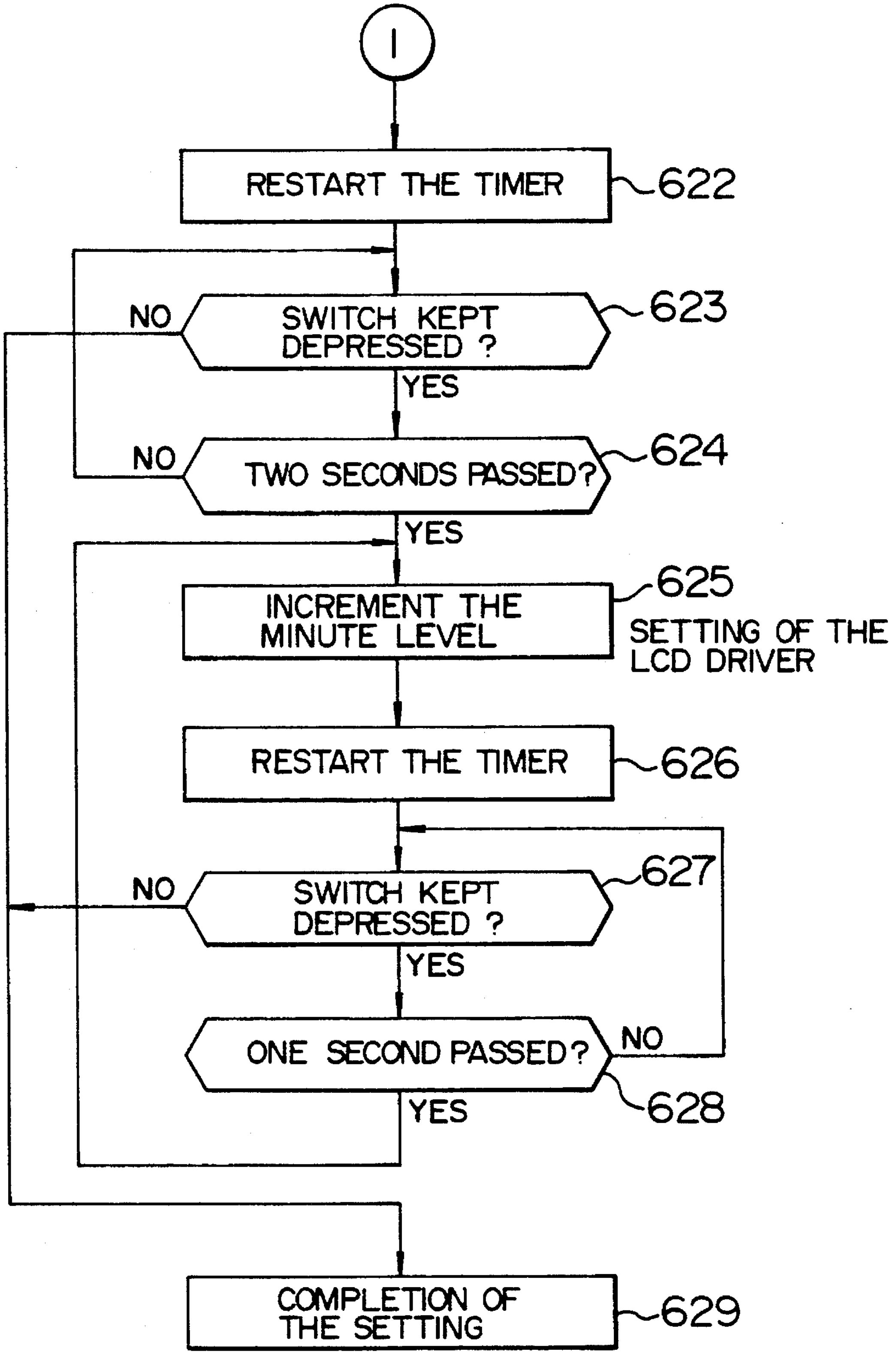
Figure 7:
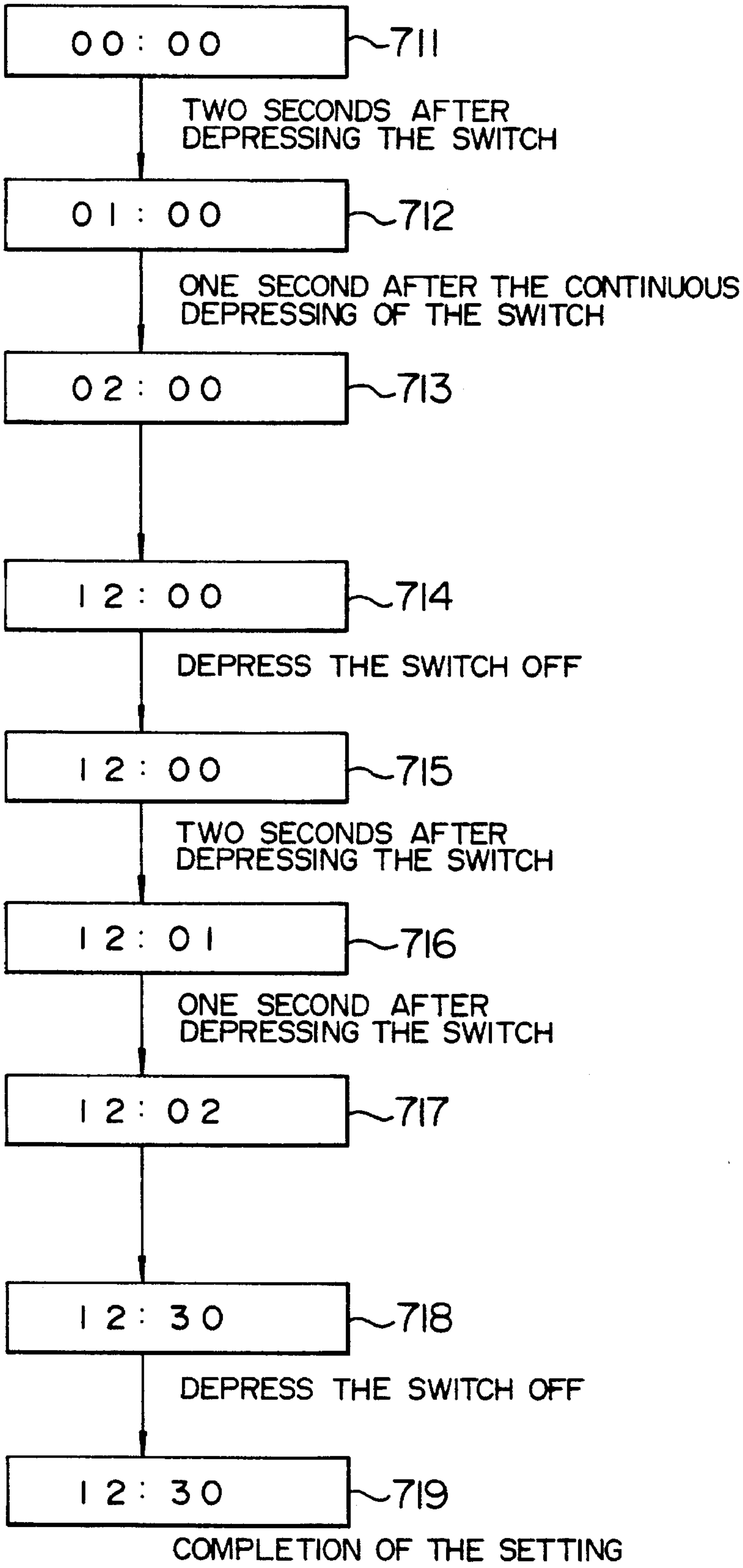
FIG. 7 is an explanatory diagram showing an example of information displayed in the display unit when an operation is carried out in the sequence shown in FIG. 6.

FIG. 5 is a timing chart for explaining the operation of FIGS. 6A and 6B comprise flow chart for explaining the operation of the clock time setting section shown in FIG. 1, and FIG. 7 is a diagram for showing the changes of the state of the switch operation and the display of the display unit based on the operation flow chart shown in FIG. 6.

An output of the radio section is inputted to the control section 140 to be compared as a receiving signal. The control section 140 reads a selective call number from the ROM for a selective call number 17, inputs the read number as a reference information code to the comparing section 141 for comparing a selective call number. The control section 140 also inputs an output signal of the radio section 12 as an information code to be compared to the comparing section 141 for comparing a selective call number, so that the comparing section 141 for comparing a selective call number compares the two input data.

The operation of the comparing section 141 for comparing a selective call number will be explained below by referring to the circuit diagram shown in FIG. 2 and the timing chart shown in FIG. 5.

Referring to FIG. 5, data $D_1$ inputted in the section $T_1$ is applied to the AND gate 423. In this case, a change-over signal IN, which has been started is inputted to both the AND gate 423 and the inversed input terminal 421. An output of the inversed input terminal 421 is inputted to the AND gate 422, and outputs from the AND gates 422 and 423 are supplied to the OR gate 424. An output of the OR gate 424 is inputted to a D input terminal of the D type flip-flop 425$_{-1}$. The D type flip-flops 425$_{-1}$ to 425$_{-n}$ are connected in series, to be able to store data of n numbers, so that these store 32 bit data having the length of one code word shown in FIG. 4. The data storage operation is carried out by supplying a clock signal $CK_1$ to the flip-flops 425$_{-1}$ to 425$_{-n}$. The data $D_1$, the change-over signal IN, and the clock signal $CK_1$ are inputted and controlled respectively as described above, thereby to store a reference information code.

Similarly, in the section $T_2$ in FIG. 5, the circulating mobile circuit 426 operates in the same manner as the circulating mobile circuit 420, to input data $D_2$, a change-over signal $IN_2$ and a clock signal $CK_2$, thereby to store an information code to be compared.

When the change-over signals $IN_1$ and $IN_2$ are "0" and also when the clock signals $CK_1$ and $CK_2$ have been inputted in the section $T_3$ in FIG. 5, the circular mobile circuits 420 and 426 are operated. Output signals from the circular mobile circuits 420 and 426 are supplied to the exclusive logical sum circuit 427. The flip-flop 430 is being reset by the R signal before the section $T_3$ which is a data circulation section. Therefore, the reference information code and the information code to be compared are circulated by n bits by the synchronous clock signals $CK_1$ and $CK_2$, and the clock signal $CK_3$ is inputted in the center of the circulation. An output of the exclusive logical sum circuit 427 is inputted to the exclusive logical sum circuit 429 via the inversed input terminal 428, and an output of the exclusive logical sum circuit 429 is inputted to a D input terminal of the flip-flop 430. By the above arrangement, a Q output of the flip-flop 430 becomes both an input to the exclusive logical sum circuit 429 and an external output signal 419 (a 0 signal). The flip-flop 430 detects an incoincidence of position corresponding to the data stored in the circular mobile circuit 420 and the data stored in the circular mobile circuit 426, if any, and the "0" signal becomes "1". Upon detecting an incoincidence, the flip-flop 430 inputs "1" to the exclusive logical sum circuit 429, thus maintaining the state of incoincidence. This state is not cancelled until the R signal is inputted next.

In the manner as described above, it is possible to obtain the result of comparing the reference information code and an information code to be compared, from the circuit shown in FIG. 2.

Referring to FIG. 1 again, the ROM for a selective call number 17 stores a selective call number and a separate message information code for a clock time setting mode. The control section 140 sets a selection call number which has been read in advance from the ROM for a selective call number 17 to the comparing section 141 for comparing a selective call number and sets a separate message information code to the comparing section 142 for comparing the message information code, respectively.

The control section 140 inputs an output signal from the radio section 12 as an information code to be compared to the comparing section 141 for comparing a selective call number, to compare the signal with the reference information code. When a coincidence signal (the "0" signal becomes "1") has been outputted as a result of the comparison, the control section 140 then inputs a succeeding message information code as an information code to be compared to the comparing section 142 for comparing a message information code, as shown in FIG. 3(B). When a coincidence signal has been inputted from the comparing section 141 for comparing a selective call number, the clock time setting section 145 within the control section 140 is started.

When, for example, separate message information set in the section for comparing a message information code 142 is "117", a code string as shown in FIG. 4(B) is obtained. The clock time setting section 145 electrically detects the operation of the switch 15, controls the timer 143 and the display driving section 144 to set a clock time, and displays the set time in the display unit 18.

FIGS. 6A and 6B show flow charts for the operation of the clock time setting section 145 which has received an output signal from the comparing section 142 for comparing a message information code in the clock time setting mode. At first, the clock time setting is started (Step 611), to start the clock (the time is "00:00"). An output is produced to the display driving section 144, and the display unit 18 displays the initial value (Step 711 in FIG. 7). Then, a depressing of the switch 15 by an operator is awaited (Step 612). When the switch has been depressed (Step 612), the timer 143 is started (Step 613), and a decision is made whether the switch has been kept depressed over a predetermined period of time (two seconds) (Steps 614 and 615). When a decision is given that the period of time when the switch has been kept depressed is short of the predetermined time, the step goes to the setting of a minute level in Step 620. When a decision has been given that the switch has been kept depressed during the predetermined period of time (Step 615), a numerical value of the hour level is incremented by 1 (Step 616). When the numerical value of the hour level has been incremented by one, the result of incrementing by one is outputted to the display driving section 144. The timer 143 is started again (Step 617), and a decision is made whether the switch 15 has been kept depressed (Steps 618 and 619). The process goes back to the step of making a decision about the depression of the switch (Step 618) with a predetermined time (a period of one second) (Step 619), and the numerical value of the hour level is incremented by one. Each time when the Steps from 616 to 619 have been repeated, the numerical value of the hour level is incremented by one in a predetermined period of time (one second), and when the continuous operation of the switch 15 has been cancelled, the setting of the hour level is terminated and the process goes to the mode for setting a minute level (Step 620). This state is displayed in the display unit 18 as shown in Steps 711 to 714 in FIG. 7. In FIG. 7, a display as shown in Step 711 is made in the display unit in the state of the Step 611 in FIG. 6A. When the switch 15 has been depressed, the process flows from the Step 612, to 613,614 and 615, repeating the Steps 614 and 615. When the process goes to the Step 616 after meeting the Step 615, the state shown in Step 712 is displayed. The process then flows through the Steps 616, 617, 618 and 619, repeating the Steps 618 and 619. When the process goes to the Step 619 after meeting the Step 618, the state shown in Step 713 is displayed. The process which flows from the Step 616 to the step 619 and returns again to the Step 616 is repeated ten times further, so that in ten seconds, the state shown in Step 714 is displayed. Since the operation of depressing the switch 15 has terminated before reading the Step 616 in the Step 714, the cancellation of the switch 15 is detected in the Step 618, so that the state shown in Step 715 is displayed in the Step 620. The Step 715 is in the state of waiting for a setting of a minute level.

When the minute level setting mode has started, Steps 621 to 628 correspond to the Steps 612 to 619, to set a minute level in the same manner as that for setting an hour level. When the operation of the switch 15 has been detected (Steps 620 and 621), the timer 143 is started (Step 622), and a decision is made whether the numerical value of a first minute level is to be incremented or not (Steps 623 and 624). If the numerical value is to be incremented, the numerical value of the minute level is incremented by "1" (Step 625), and the result of incrementing the numerical value is outputted to the display driving section 144. Then, the timer 143 for setting a time interval to be incremented is started (Step 626), and a decision is made whether an increment is to be made or not (Steps 627 and 628). Each time when the Steps from 625 to 628 have been repeated, the numerical value of the minute level is incremented by "1".

The cancellation of the switch 15 is detected (Step 623 or 627), and then the setting of a minute level is terminated, thus completing the setting of time (Step 629). This state is displayed in the display unit 18 as shown in Steps 715 to 719 in FIG. 7. The Step 715 is proceeded to the Step 716 when the switch 15 is depressed and is kept depressed continuously for two seconds, for example. For the setting of a minute level, the switch 15 is kept depressed for one second, for example. When the continuous depressing of the switch 15 for one second has been completed and the switch 15 is undepressed, the setting of a minute level has been completed.

In FIG. 7, when each time the operation of depressing the switch 15 has been carried out again in the same manner as that of the setting of an hour level, the numerical value of the minute level is incremented by one. When the switch 15 is depressed in Step 715, the process flows through the Steps 621, 622, 623 and 624, repeating the Steps 623 and 624. When the Step 625 is reached after meeting the Step 624, the state shown in Step 716 is displayed. The process flows through the Steps 625,626, 627 and 628, repeating the Steps 627 and 628. When the Step 625 is reached after meeting the Step 628, the state as shown in Step 717 is displayed. When the process of flowing from the Step 625 to the Step 628 and reaching the Step 625 again is repeated 28 times further, the state shown in Step 718 is displayed. In Step 718, since the depression of the switch 15 has been terminated before reacting the next Step 625, the cancellation of the switch 15 is detected in the Step 627, and when the Step 629 is reached, the state shown in Step 719 is displayed.

By having the above-described process, the setting of a clock time (a clock time "12:30") has been completed.

According to the present embodiment, when the above-described operation is carried out, it becomes possible to set a clock time in a simple procedure by using a small number of parts.

The switch 15 does not need to be an exclusive one for setting a time, but it may also have other function such as a message recall function or the like.

According to the present embodiment, there is an advantage that it is possible to have an operation state of a clock time setting mode, without expanding the existing switches or without a complex procedure for the switch operation.

Since no exclusive switches are required in the present invention, there is also an effect that it is possible to avoid the operation state from being shifted to the clock time setting mode due to a malfunction of the switch. Further, according to the present invention, it is possible to register separate message information for controlling in the clock time setting mode as desired message information which can be easily handled.

Figure 8:
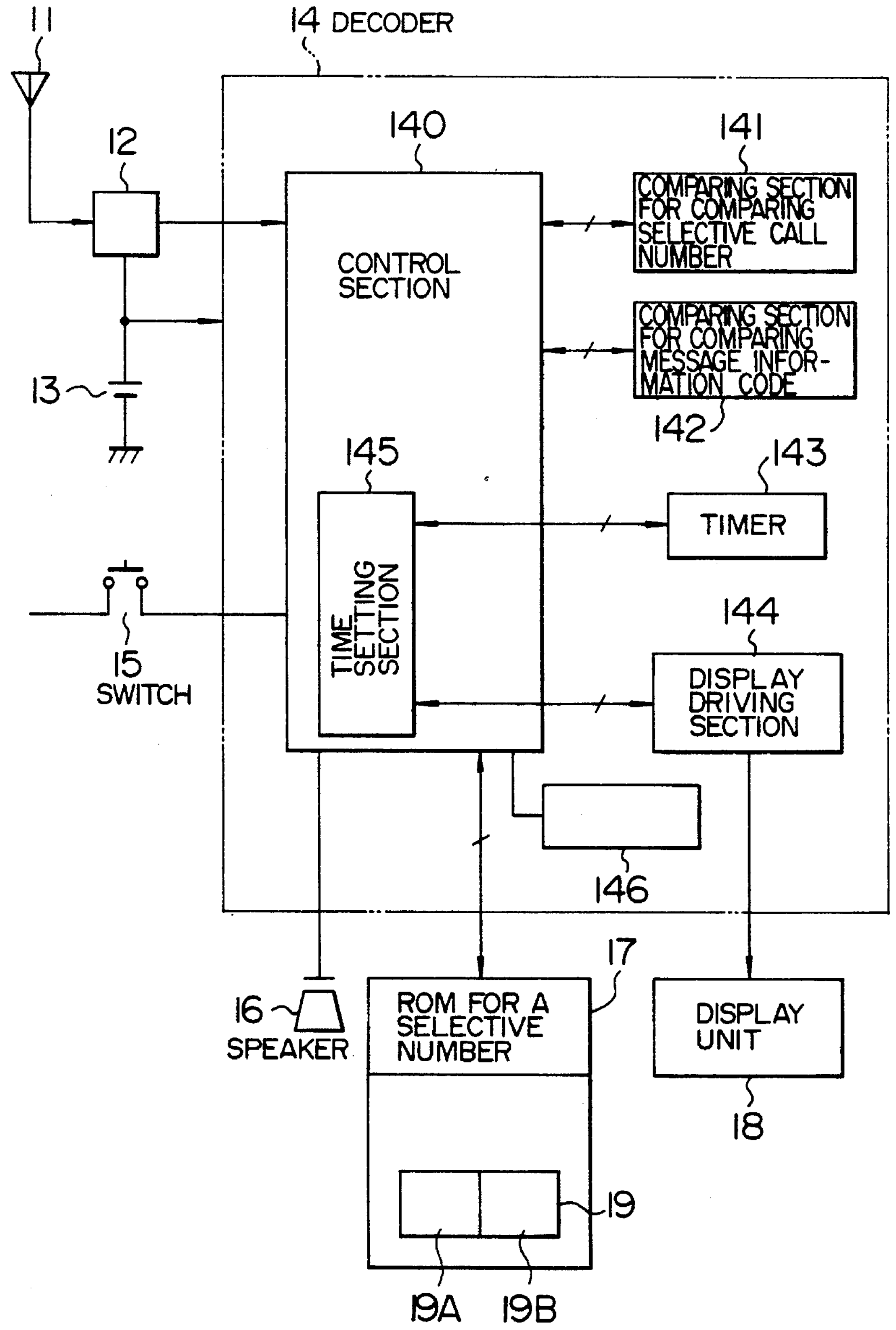
FIG. 8 is a circuit diagram showing a separate embodiment.

FIG. 8 shows another embodiment of the present invention. FIG. 8 is the same as FIG. 1 except that the ROM for a selective call number 17 has a plurality of individual message information 19A and 19B provided in an information storage section 19 for individual messages, and that a receiving time storage circuit 146 is provided in a RAM or the like, attached to the control section 140.

In the above configuration, when a call number that coincides with the ROM 17 has been received, the call receiving time is stored in the storage circuit 146 for storing a call receiving time. Accordingly, the display unit 18 can display not only the current time (clock) information that has been set (corrected) by the clock time setting section 145 but also the time information of receiving a message obtained from the storage circuit for storing the receiving time 146, and a lapse time for the period from a call receiving time to a call (recall) time.

When a plurality of message information has been set in the information storage section 19, it is possible to combine selective functions of the display content as well as to start the setting of a clock time by comparing the stored information with receiving information. For example, the current time is displayed when the number is "1171" and the lapse time is displayed when the number is "1172".

I claim:

1. A selective call receiving apparatus comprising:

call receiving means including a decoder, for receiving and decoding a signal of a selective call number associated with the selective call receiving apparatus and a signal of message information attached to said selective call number;

display means for displaying the decoded message information, clock time and information for use in the selective call number receiving operation;

comparing means for comparing said decoded message information with preset individual message information and generating a coincidence signal when said decoded message information and said preset individual message information coincide; and control means including clock time setting means responsive to said coincidence signal for updating clock time displayed by said display means and including a manual switch for actuation to selectively function as (a) an operating switch of said call receiving means and (b) an input switch for enabling clock updating operations, first means for detecting the coincidence signal generated by said comparing means to thereby make said manual switch function as said input switch, and second means for detecting an actuated state of said manual switch kept in a predetermined time period to thereby cause one of said clock updating operations, wherein said display means is adapted to display the updated clock time.

2. A selective call receiving apparatus according to claim 1, wherein said clock time information includes at least one of the current time and time information received as a selective call number by said receiving means.

3. A selective call receiving apparatus according to claim 1, wherein said preset individual message information comprises a plurality of information stored in a storage circuit.

4. A selective call receiving apparatus according to claim 3, wherein said plurality of information includes information for specifying the content of information to be displayed among said time information in addition to information for starting said clock time setting means.

5. A method of setting a clock time to be displayed in a selective call receiving apparatus with clock time setting means and a display, comprising the steps of:

receiving and decoding a signal of a selective call number and individual message information, associated with said apparatus;

comparing the decoded message information with individual message information stored in said apparatus;

generating a coincidence signal by detecting a coincidence between the compared message information;

manually actuating a single switch provided at said apparatus to control operations of said apparatus and said clock time setting means;

enabling the clock time setting means with detection of the generated coincidence signal and causing the time setting means to perform a clock setting operation thereof by detecting a state of manual actuation of said single switch, when the state of manual actuation is held for a predetermined period; and displaying thus set clock time on said display.

6. A method of setting and displaying a clock time for a selective call receiving apparatus with clock time setting means and a display, comprising the steps of:

receiving and decoding at said apparatus, a selective call number associated therewith and individual message information attached to the selective call number;

comparing the decoded individual message information with individual message information previously stored in said call receiving apparatus;

generating a coincidence signal when the result of the comparing step indicates that said individual message information and said stored message information coincide;

starting the operation of the clock time setting means by actuating a manual switch means, said manual switch means for selectively functioning as (a) an operating switch for use in said call number receiving step and (b) an input switch for enabling input of clock setting information to correct a displayed clock time;

wherein said manual switch means functions as said input switch only when said coincidence signal is generated, and enables input of a given amount of clock time setting information when an actuated state of said manual switch is held for a predetermined period; and displaying thus-corrected clock time on said display.

* * * * *